US008019233B2

(12) United States Patent
Chen et al.

(10) Patent No.: US 8,019,233 B2
(45) Date of Patent: Sep. 13, 2011

(54) METHOD AND APPARATUS FOR USING A HOLOGRAM TO CONTROL THE OPTICAL FIELD DISTRIBUTION OF LIGHT GENERATED BY A LIGHT SOURCE AND LAUNCHED INTO AN END OF AN OPTICAL WAVEGUIDE

(75) Inventors: Ye Chen, San Jose, CA (US); Penyue Wen, Cupertino, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 680 days.

(21) Appl. No.: 12/130,074

(22) Filed: May 30, 2008

(65) Prior Publication Data
US 2009/0296177 A1 Dec. 3, 2009

(51) Int. Cl.
*H04B 10/04* (2006.01)
*G03H 1/08* (2006.01)
(52) U.S. Cl. .............. 398/200; 398/201; 359/9; 359/15; 430/2; 385/15

(58) Field of Classification Search .......... 398/200–201; 385/15, 24, 31, 39; 359/9, 15, 35; 430/2
See application file for complete search history.

(56) References Cited

U.S. PATENT DOCUMENTS

| 5,774,239 | A  | * | 6/1998 | Feldman et al. ................. 359/9 |
| 6,349,159 | B1 |   | 2/2002 | Uebbing et al. |
| 6,452,669 | B1 | * | 9/2002 | Morris et al. ................. 356/215 |
| 6,496,621 | B1 | * | 12/2002 | Kathman et al. ................. 385/31 |
| 2004/0008414 | A1 |   | 1/2004 | Coleman et al. |

FOREIGN PATENT DOCUMENTS

WO    WO 02/05004 A2    1/2002

* cited by examiner

*Primary Examiner* — Leslie Pascal

(57) ABSTRACT

A diffractive coupling element based on a computer-generated hologram is used in an optical coupling system of a transmitter to control the launch of laser light from a laser light source onto an end of an optical fiber. The diffractive coupling element controls the launch of the laser light such that a desired optical intensity distribution pattern is provided that substantially avoids the center and edge refractive index defects contained in the optical fiber.

21 Claims, 4 Drawing Sheets

METHOD AND APPARATUS FOR USING A HOLOGRAM TO CONTROL THE OPTICAL FIELD DISTRIBUTION OF LIGHT GENERATED BY A LIGHT SOURCE AND LAUNCHED INTO AN END OF AN OPTICAL WAVEGUIDE

TECHNICAL FIELD OF THE INVENTION

The invention relates to optical fiber networks over which data is communicated in the form of optical signals transmitted and received over optical waveguides. More particularly, the invention relates to a method and an apparatus for using a hologram to provide launch control of light generated by a light source and launched into an end of an optical fiber of an optical fiber network.

BACKGROUND OF THE INVENTION

In optical communications networks, optical transceiver modules are used to transmit and receive optical signals over optical fibers. A transceiver module generates amplitude and/or phase and/or polarization modulated optical signals that represent data, which are then transmitted over an optical fiber coupled to the transceiver. The transceiver module includes a transmitter side and a receiver side. On the transmitter side, a laser light source generates laser light and an optical coupling system receives the laser light and optically couples, or images, the light onto an end of an optical fiber. The laser light source typically comprises one or more laser diodes that generate light of a particular wavelength or wavelength range. The optical coupling system typically includes one or more reflective elements, one or more refractive elements and/or one or more diffractive elements.

In high-speed data communications networks (e.g., 10 Gigabits per second (Gb/s) and higher), multimode optical fibers are often used. In such networks, certain link performance characteristics, such as the link transmission distance, for example, are dependent on properties of the laser light source and on the design of the optical coupling system. Among the most dominant ones are the modal bandwidth of the fiber and the relative intensity noise (RIN) of the laser light source, which can be degraded by the optical back-reflection to the laser light source. Both of these parameters can be affected by the launch conditions of the laser light into the end of the multimode optical fiber.

In the last decade, extensive investigations have been conducted to determine the effects on modal bandwidth that result when laser diode light sources are used versus when light emitting diode (LED) light sources are used. Based on these investigations, it has been determined that the effective modal bandwidth of multimode fiber is dependent upon the launch conditions of the laser light into the end of the fiber. The launch conditions are, in turn, dependent upon the properties of the laser diode itself and upon the optical coupling system design and configuration. However, due to limitations on the manufacturability of optical elements that are typically used in imaging-type optical coupling systems, control of the launch conditions is limited primarily to designing and configuring the optical coupling system to control the manner in which it images the light from the laser source onto the end of the fiber. Other types of non-imaging optical coupling system designs exist, such as spiral launch designs, for example, that overcome certain disadvantages of the imaging-type optical coupling systems. Such non-imaging systems, however, also have shortcomings.

It is well known that center and edge defects exist in the refractive index profile of multimode fibers. Such defects are generally due to the nature of the processes that are used to manufacture the fibers. It is also known that when these types of fibers are used with laser light sources, the existence of the defects can dramatically change the effective modal bandwidth of the fiber and degrade it below the out-of-factory minimum specification. For these reasons, efforts are made to control the launch conditions of the laser light to prevent the laser light from passing through the areas in the fiber where the defects are most severe and where the occurrence of the defects is more frequent.

For example, in spiral launch optical coupling systems, the laser light from the source is encoded with a phase pattern that rotates the phase of the light linearly around the optical axis of a collimating lens that is used to couple the light from the source onto the end of the optical fiber. Rotating the phase of the laser light about the optical axis helps ensure that refractive index defects in the center of the fiber are avoided. In addition, the spiral launch methodology is relatively successful at reducing optical feedback from the fiber end to the laser aperture, which can destabilize the laser.

The main disadvantage of the spiral launch methodology is that it can result in differential mode coupling efficiency problems. When laser light is launched from a laser having a small numerical aperture (NA), the laser light coupled by the lens onto the fiber end tends to be more spread out. Similarly, when laser light is launched from a laser having a large NA, the laser light coupled by the lens onto the fiber end tends to be more confined. With graded-index multimode fiber, this effect causes unequal coupling efficiencies of the laser light depending on the NAs of the lasers. This inequality in the coupling efficiencies of the different modes can lead to the occurrence of mode-selective noise as well as deterioration of the signal rising edge, which are undesirable.

In many applications, vertical cavity surface emitting laser diodes (VCSELs) are used as the laser light source for generating multimode laser light. In VCSELs, the NAs are smaller for the lower modes and larger for the higher modes. Consequently, the sensitivity of the spiral launch methodology to the NA makes differential mode coupling efficiency an even greater problem in cases where VCSELs are used as the laser light source.

Accordingly, it would be desirable to provide a method and apparatus that enable the launch of the laser light into the end of a fiber to be controlled in such a way that center and edge refractive index defects in the fiber are avoided. It would also be desirable to provide such launch control while maintaining relatively equal coupling efficiencies for different modes and while reducing optical feedback from the fiber end to the laser aperture.

SUMMARY OF THE INVENTION

The invention is directed to a method and an apparatus for using a hologram to provide launch control of light generated by a light source and launched into an end of an optical fiber of an optical fiber network. The apparatus comprises an optical transmitter for use in a communications link. The transmitter comprises a laser light source, a laser controller and an optical coupling system. The laser light source produces laser light. The laser controller controls the laser light source. The optical coupling system includes at least a diffractive coupling element. The diffractive coupling element comprises a substrate material having a phase distribution pattern formed therein. The diffractive coupling element provides the light to be coupled by the optical coupling system into an end of an optical fiber with a selected intensity distribution pattern.

The method comprises selecting a target intensity distribution pattern for laser light to be launched from a laser source into an end of an optical fiber, selecting a hologram that has a phase distribution pattern that is transformable into the selected intensity distribution pattern, and designing a diffractive coupling element that includes a design of a substrate material having the phase distribution pattern of the selected hologram formed in it.

These and other features and advantages of the invention will become apparent from the following description, drawings and claims.

Figure 1:
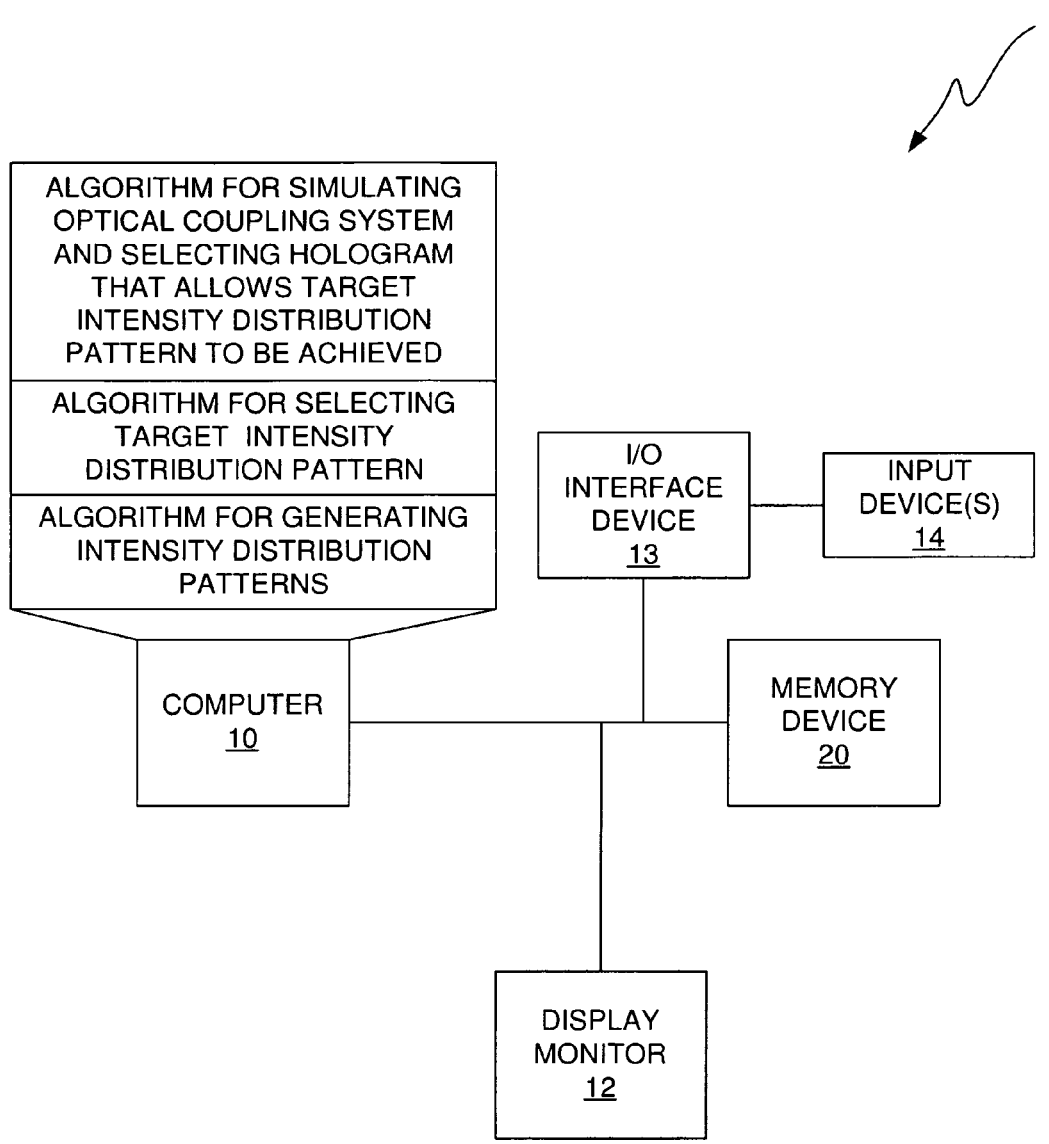
FIG. 1 illustrates a block diagram of the apparatus of the invention in accordance with an illustrative embodiment.

DETAILED DESCRIPTION OF AN
ILLUSTRATIVE EMBODIMENT

In accordance with the invention, a diffractive coupling element based on a computer-generated hologram is used in an optical coupling system of a transmitter to control the launch of laser light from a laser light source onto an end of an optical fiber. The diffractive coupling element controls the launch of the laser light by providing it with a desired optical intensity distribution pattern that substantially avoids the center and edge refractive index defects contained in the optical fiber. The diffractive coupling element rearranges the transversal laser light modes in the spatial domain and overlaps them substantially while the modes propagate in free-space and an optical fiber.

The diffractive coupling element is typically designed as follows. One or more algorithms are performed that generate intensity distribution patterns and select one of the generated intensity distribution patterns based on its effectiveness at avoiding refractive index defects at the center and edges of the fiber. Once the intensity distribution pattern has been selected, one or more other algorithms are performed, which receive as input the selected intensity distribution pattern and which perform an optical coupling system simulation that generates holograms, inserts each hologram into the simulated optical coupling system, and selects the hologram that results in the simulated optical coupling system achieving the desired intensity distribution pattern.

Once the hologram has been selected, a diffractive coupling element that is suitable for use in an actual optical coupling system having the simulated design may be designed and manufactured to reproduce the corresponding hologram. The diffractive coupling element is manufactured by mapping the phase pattern of the selected hologram into spatial variations in the thickness and/or index of refraction of a suitable substrate material, which may be, for example, glass, plastic, polymers or semiconductor materials. The diffractive coupling element may then be included in an optical coupling system of a transmitter to control the launch of laser light from a source of laser light onto an end of an optical fiber.

The diffractive coupling element of the invention is particularly well suited for use in multimode optical communications links in which VCSELs are employed as the laser light sources. In many cases, it is desirable to use a VCSEL as the laser light source due to certain advantages they provide, such as their ability to be tested on the wafer, as compared to edge emitting laser diodes that normally must be singulated before they can be tested. In addition, VCSELs have significantly lower power consumption and more compact packaging than edge emitting laser diodes, which are also desirable attributes. However, because the laser light produced by VCSELs has multiple modes, avoidance of the center and edge refractive index defects is important in preventing differential mode coupling problems. By using the diffractive coupling element based on an appropriate computer-generated hologram, center and edge refractive index defects can be substantially avoided. In addition, as described in more detail below, use of the diffractive coupling element results in improved effective modal bandwidth (EMB) for the optical communications link and reduced optical feedback from the fiber end to the laser aperture.

Additionally, the computer-generated hologram is capable of mapping each VCSEL mode spatially so that the modes have substantial spatial overlap when propagating in free-space, in the optical coupling system, and in the fiber. This property significantly reduces mode selective noise should any loss of light occur due to misalignment between elements of the optical coupling system or due to the misalignment between the optical coupling system and the fiber. Because the modes propagate with substantial spatial overlap, coupling loss tends to be equally distributed among all modes, resulting in reduced mode selective loss.

FIG. 1 illustrates a block diagram of the apparatus 1 of the invention in accordance with an illustrative embodiment. The apparatus 1 includes a computer, such as, for example, a work station or personal computer (PC) that performs the algorithms that carry out the tasks described above, namely: (1) generating intensity distribution patterns that should avoid center and edge refractive index defects in a type of fiber expected to be used in the link, (2) selecting one of the generated intensity distribution patterns based on its effectiveness at avoiding the center and edge refractive index defects, (3) simulating an optical coupling system, during which (a) holograms are generated and inserted into the system, (b) determining which hologram results in the selected intensity distribution pattern being achieved, and (c) selecting the corresponding hologram for use in producing a diffractive coupling element.

Algorithms (1), (2) and (3)(a)-(3)(c) are typically performed in software, but may be performed in hardware or in a combination of hardware and software and/or firmware. Software and/or firmware for implementing the algorithms are typically stored in a memory device 20 that is in communication with the computer 10. The computer 10 includes some type of computational device for performing the algorithms, such as, for example, one or more microprocessors, application specific integrated circuits (ASICs), microcontrollers, programmable gate arrays (PGAs), programmable logic arrays (PLAs), or combinations thereof. The memory device 20 may be any type of computer-readable medium, such as, for example, random access memory (RAM)

devices, read only memory (ROM) devices, programmable ROM (PROM), erasable PROM (EPROM), flash memory devices, magnetic memory devices, optical memory devices, etc.

The apparatus 1 typically also includes a display monitor 12, an input/output (I/O) interface device 13, and one or more input devices 14 (e.g., a keyboard, a mouse, a stylus, etc.) connected to the I/O interface device 13 for allowing a user to interact with the computer 10. For example, to setup the simulation described above, the user may enter information via the input devices 14 describing a type of multimode optical fiber to be used in the communications link, a type of intensity distribution pattern to be produced by the simulated optical coupling system (e.g., attenuation of one or more modes), a type of laser light source to be used in the link, refractive and/or reflective optical elements to be used in the simulated optical coupling system, etc.

Figure 2:
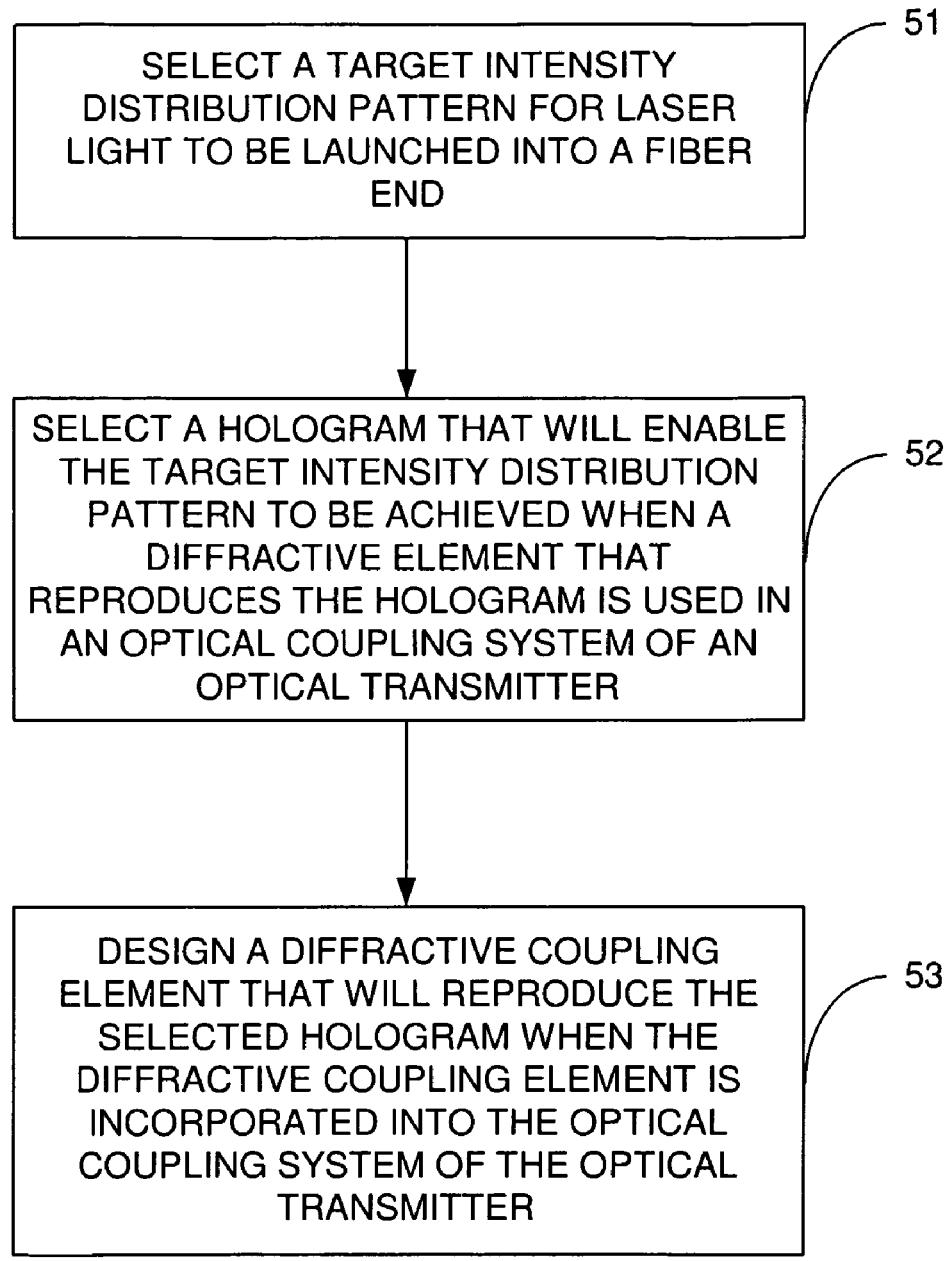
FIG. 2 illustrates a flowchart that represents a method in accordance with an embodiment performed by the apparatus shown in FIG. 1 to provide launch control in an optical transmitter.

FIG. 2 illustrates a flowchart that represents a method in accordance with an embodiment for performing launch control in an optical transmitter. A target intensity distribution pattern is selected for laser light to be launched from a laser light source of an optical transmitter and coupled into an end of an optical fiber by an optical coupling system of the optical transmitter, as indicated by block 51. A hologram is then selected that will enable the target intensity distribution pattern to be achieved through incorporation of a diffractive coupling element into the optical coupling system that reproduces the hologram, as indicated by block 52. A diffractive coupling element is then designed that will reproduce the hologram when incorporated into the optical coupling system, as indicated by block 53.

The functionality represented by blocks 51-53 in FIG. 2 for performing launch control in an optical transmitter may be performed using one or more of a variety of different algorithms. The invention is not limited to any particular algorithm or combination of algorithms for performing these functions. Persons of ordinary skill in the art will understand, in view of the description provided herein, the manner in which suitable algorithms can be designed and implemented for this purpose. An example of a suitable algorithm for performing the processes represented by blocks 51 and 52 in FIG. 2 will now be described with reference to FIG. 3.

Figure 3:
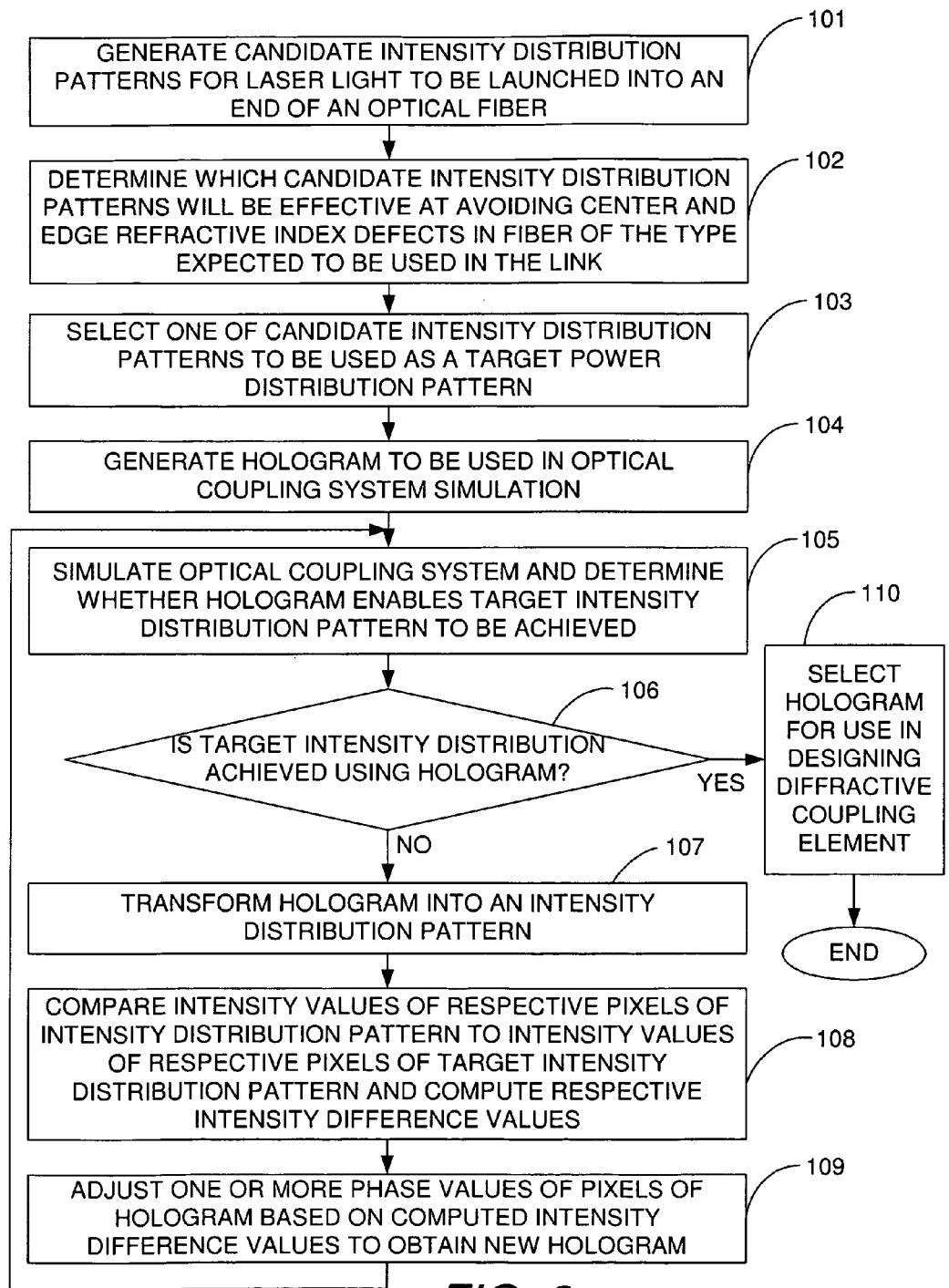
FIG. 3 illustrates a flowchart that represents the method in accordance with an embodiment performed by the apparatus shown in FIG. 1 for selecting a computer-generated hologram that is suitable for providing launch control in an optical communications system.

FIG. 3 illustrates a flowchart that represents the method in accordance with an embodiment for selecting a computer-generated hologram that is suitable for providing launch control in an optical communications system. One algorithm performed by the computer 10 causes intensity distribution patterns to be generated, as indicated by block 101. When the intensity distribution patterns are generated, each pattern is represented by an array of pixels, with each pixel having an address corresponding to a spatial location in the pattern. Each pixel in the array also has a corresponding intensity value. The intensity values are typically stored in the memory device 20 at memory addresses that are associated with the pixel addresses such that each memory address that contains a pixel intensity value can be mapped to a corresponding pixel address.

As the intensity distribution patterns are generated, they are analyzed to determine which of the patterns should be most effective at avoiding center and edge refractive index defects in a fiber of the particular type expected to be used in the link, as indicated by block 102. As part of this algorithm, a suitable intensity distribution pattern is selected, as indicated by block 103. The selected intensity distribution pattern is referred to herein as the "target" intensity distribution pattern. The intensity distribution pattern that is selected will typically be the pattern that was determined at block 102 to be the most effective at avoiding center and edge refractive index defects. The algorithmic processes represented by blocks 101-103 may be implemented in a single computer software program or in multiple respective computer software programs. Alternatively, the processes may be performed partially or wholly in one or more computer hardware devices. As yet another alternative, a user may input a desired intensity distribution pattern to the computer 10 via one of the input devices 14. In the latter case, the processes represented by blocks 101-103 may be eliminated.

After the target intensity distribution pattern has been selected, the computer 10 performs an algorithm that generates holograms, as indicated by block 104. In accordance with an embodiment, this algorithm begins with a randomly generated hologram, which is essentially a phase distribution pattern, also referred to interchangeably herein as a holographic phase pattern or simply as a hologram. The hologram is represented by an array of pixels, with each pixel having an address that corresponds to a spatial location in the hologram. Each pixel of the array has a phase value that is randomly set to a value that is within a particular range, e.g., from 0 to $2\pi$. The phase values are typically stored in the memory device 20 at memory addresses that are associated with the pixel addresses such that each memory address can be mapped to a corresponding pixel address.

After the random holographic phase pattern has been generated, the computer 10 performs a simulation algorithm that simulates an optical coupling system and determines whether the hologram enables the target intensity distribution pattern to be achieved, as indicated by block 105. Block 106 represents the determination being made as to whether the hologram will enable the target intensity distribution pattern to be achieved. If so, the hologram is selected to be used for designing a diffractive coupling element that is suitable for implementation in the actual optical coupling system of the transmitter, as indicated by block 110. Because the initial phase values of the computer-generated hologram are randomly set, it is unlikely that the process will proceed to block 110 after the first iteration of the process.

If a determination is made at block 106 that use of the hologram in the simulation did not result in the target intensity distribution pattern being achieved, then the process proceeds to block 107. At block 107, a transformation algorithm is performed that transforms the holographic phase pattern into an intensity distribution pattern. Typically, a Fast Fourier Transformation (FFT) algorithm is used for this purpose. The FFT algorithm transforms the array of phase values into an array of intensity values. The intensity values resulting from the transformation are then compared to the respective intensity values of the target intensity distribution pattern and respective intensity difference values are computed, as indicated by block 108. The respective phase values of the holographic phase pattern are then adjusted based on the respective intensity difference values, as indicated by block 109. This adjustment of the phase values results in a new hologram. The process then returns to block 105 for simulation of the optical coupling system using the new hologram. The process continues to iterate until a suitable hologram has been selected at block 110.

Once a suitable computer-generated hologram has been selected, the computer 10 performs the process represented by block 53 in FIG. 2, which maps each respective phase value of each respective pixel of the hologram to a respective surface thickness and/or index of refraction at a respective spatial location in a substrate material. The phase values of the pixels and the thicknesses (and/or index of refraction) and spatial locations to which the phase values are mapped are typically stored in memory device 20 and accessed by the computer 10 as needed. Thus, the phase values of the hologram map to variations in the thickness and/or the index of refraction of the substrate material.

After this mapping has occurred, a suitable substrate material may be processed using one or more of a variety of techniques to form a diffractive coupling element that will reproduce the hologram. For example, in cases where glass or a semiconductor material is used as the substrate material, the variations in the surface thickness of the substrate material that provide the phase variations needed to reproduce the hologram may be obtained by using photolithographic techniques. In cases where plastics or polymers are used as the substrate material, the variations in the surface thickness of the substrate material may be obtained by using injection molding techniques or embossing techniques. Because the manner in which computer-generated holograms may be transferred to suitable substrate materials is known, a detailed description of this process will not be provided herein.

The phase distribution pattern formed in the substrate material may be radially symmetric or asymmetric relative to an optical axis of the optical coupling system that is aligned with an optical axis of the fiber. If the phase distribution pattern is radially asymmetric relative to the optical axis of the optical coupling system, optical feedback in the form of back reflection from the fiber end face and reflection points in the communication link to the laser aperture can be further reduced. As indicated above, optical feedback can de-stabilize the laser light source and lead to more laser noise. Therefore, in cases in which reducing or minimizing such feedback is a priority, use of a radially asymmetric phase distribution pattern in the substrate material allows this goal to be achieved.

Figure 4:
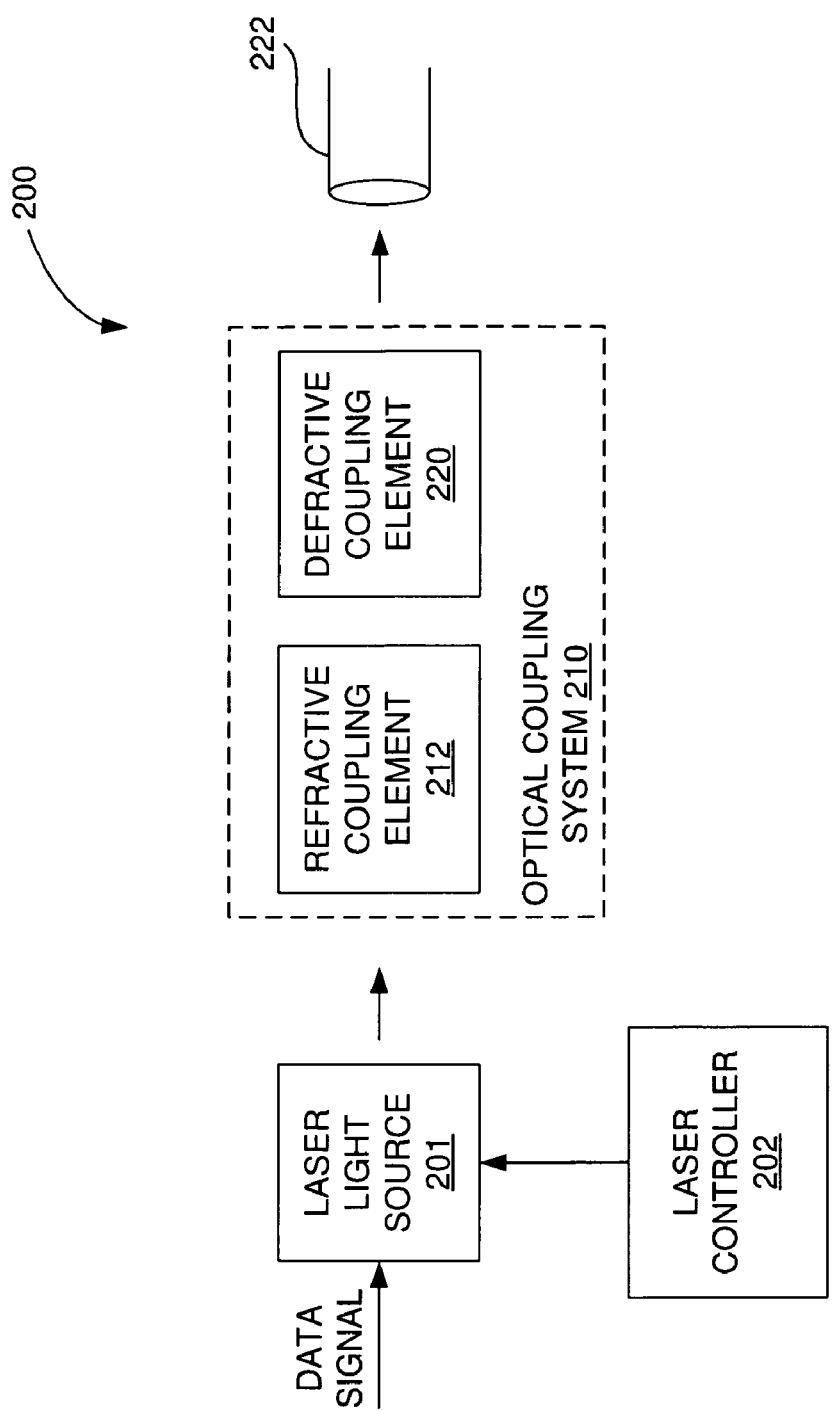
FIG. 4 illustrates a block diagram of an optical transmitter having an optical coupling system in which a diffractive coupling element is incorporated in accordance with an embodiment.

FIG. 4 illustrates a block diagram of an optical transmitter 200 having an optical coupling system 210 in which a diffractive coupling element 220 is incorporated in accordance with an embodiment. The optical transmitter 200 is typically part of an optical transceiver module (not shown) that includes an optical receiver (not shown). The term "optical transmitter", as that term is used herein, is intended to mean a transmitter having components for generating an optical signal for transmission over an optical waveguide, such as an optical fiber.

The transmitter 200 includes a laser light source 201 that is modulated by an electrical data signal to produce an optical data signal. A laser controller 202 controls the bias current of the laser light source 201. The transmitter 200 typically includes monitoring circuitry (not shown) that monitors the output power level of the laser light source 201 and produces a feedback signal that is fed back to the laser controller 202. The laser controller 202 controls the bias current of the laser light source 201 based on the feedback signal. For ease of illustration, the components of the transmitter 200 that monitor the output power of the laser light source 201 and generate the feedback signal that is used by the laser controller 202 to control the laser light source 201 are not shown in FIG. 4.

The laser light that is produced by the laser light source 201 is received by the optical coupling system 210 and coupled by the optical coupling system 210 into the end of an optical fiber 222. In accordance with the invention, the optical coupling system 210 includes at least one diffractive coupling element 220 designed in accordance with the method described above with reference to FIG. 3. The optical coupling system 210 typically also includes at least one refractive coupling element 212 that operates on the laser light in conjunction with the diffractive coupling element 220 to provide the desired launch control over the laser light launched from the laser light source 201. The refractive coupling element 212 is optional, and if included, may be positioned before or after the diffractive coupling element 220 in the optical path from the laser light source 201 to the end of the fiber 222. The diffractive coupling element 220 and the refractive coupling element 212 may be integrally formed in a single substrate material. Alternatively, the diffractive coupling element 220 and the refractive coupling element 212 may be separate components. The diffractive coupling element 220 is typically a diffraction grating designed and manufactured to reproduce the selected computer-generated hologram. The refractive coupling element 212 is typically one or more lenses or surfaces that operate together on the light produced by the laser light source 201 and in conjunction with the diffractive coupling element 220 to direct the light onto the fiber end face in a particular manner. The diffractive coupling element 220, however, produces and determines the selected intensity distribution pattern to be formed on the end of the optical fiber 222.

Because the intensity distribution pattern formed on the end of the optical fiber 222 is able to avoid the center and edge defects in the fiber 222, the effective bandwidth of the fiber is improved and optical feedback resulting from reflections from the fiber end back to the laser aperture is reduced. Reducing optical feedback is important to maintaining the stability of the laser light source. In addition, using the hologram to control launch conditions ensures that there is equal coupling efficiency for all of the modes of laser light, which is very important in cases where multimode fiber is used. Ensuring equal mode coupling efficiency reduces mode-selective noise and makes it feasible to use VCSELs as the laser light sources, which provides other advantages and link improvements.

It should be noted that the invention has been described with reference to a few illustrative embodiments for the purposes of demonstrating the principles and concepts of the invention. The invention is not limited to these embodiments, as will be understood by persons of ordinary skill in the art in view of the description provided herein. Those skilled in the art will understand that modifications may be made to the embodiments described herein and that all such modifications are within the scope of the invention.

What is claimed is:

1. An optical transmitter for use in a communications link, the transmitter comprising:
    a laser light source that is controllable to produce laser light;
    a laser controller for controlling the laser light source;
    an optical coupling system including at least a diffractive coupling element, the optical coupling system receiving laser light produced by the laser light source, the diffractive coupling element comprising a substrate material having a phase distribution pattern formed therein, the phase distribution corresponding to a computer-generated hologram, wherein the diffractive coupling element provides light received by the optical coupling system with a selected intensity distribution pattern, wherein the selected intensity distribution pattern is selected based on a determination that the intensity distribution pattern should be effective at substantially avoiding refractive index defects in a center region and in an edge region of an optical fiber of the communications link, and wherein the optical coupling system couples the light having the selected intensity distribution pattern provided by the diffractive coupling element into an end of an optical fiber of the communications link.

2. The optical transmitter of claim 1, wherein the substrate material of the diffractive coupling element has surface thickness variations that correspond to phase values of the selected computer-generated hologram.

3. The optical transmitter of claim 1, wherein the substrate material of the diffractive coupling element has index of refraction variations that correspond to phase values of the selected computer-generated hologram.

4. The optical transmitter of claim 1, wherein the selected computer-generated hologram is selected from a plurality of computer-generated holograms based on a determination as to whether the selected hologram has a phase distribution pattern that is transformable into an intensity distribution pattern that substantially matches the selected intensity distribution pattern.

5. The optical transmitter of claim 4, wherein the laser light produced by the laser light source has at least two modes, and wherein the diffractive coupling element causes said at least two modes to spatially overlap one another, the spatial overlapping of said at least two modes having an effect of reducing mode selective noise caused by optical misalignment.

6. The optical transmitter of claim 1, wherein the phase distribution pattern is radially asymmetric relative to an optical axis of the optical coupling system.

7. The optical transmitter of claim 1, wherein the phase distribution pattern is radially symmetric relative to an optical axis of the optical coupling system.

8. The optical transmitter of claim 1, wherein the laser light source comprises a vertical cavity surface emitting laser diode (VCSEL).

9. The optical transmitter of claim 1, wherein the laser light source comprises an edge emitting laser diode.

10. The optical transmitter of claim 1, wherein the optical coupling system further comprises:
at least one refractive coupling element, the refractive coupling element receiving laser light produced by the laser light source and coupling at least a portion of the received light through refraction onto the diffractive coupling element.

11. The optical transmitter of claim 10, wherein the substrate material of the diffractive coupling element also contains the refractive coupling element.

12. A method for designing a diffractive coupling element for controlling a launch of laser light from a laser source into an end of an optical fiber, the method being performed by one or more computers, the method comprising:
selecting a target intensity distribution pattern for laser light to be launched from a laser source into an end of an optical fiber, wherein the selected intensity distribution pattern is selected based on a determination that the intensity distribution pattern should be effective at substantially avoiding refractive index defects in a center region and in an edge region of the optical fiber;
selecting a hologram that has a phase distribution pattern that is transformable into the selected intensity distribution pattern; and
designing a diffractive coupling element to be used in an optical coupling system of an optical transmitter, the diffractive coupling element design including a design of a substrate material having the phase distribution pattern of the selected hologram formed therein.

13. The method of claim 12, wherein selecting the target intensity distribution pattern comprises:
generating a plurality of candidate intensity distribution patterns and analyzing each intensity distribution pattern to decide whether the pattern being analyzed will be effective at avoiding refractive index defects in a center portion and in edge portions of the optical fiber; and
selecting one of the candidate intensity distribution patterns as the target intensity distribution pattern based on the determination that the selected target intensity distribution pattern should be effective at avoiding refractive index defects in the center and edge regions of the optical fiber.

14. The method of claim 13, wherein selecting a hologram comprises:

(a) generating at least a first candidate hologram in a computer, the computer-generated hologram comprising a candidate phase distribution pattern, the candidate phase distribution pattern comprising a plurality of phase values;
(b) transforming the candidate phase distribution pattern into a candidate intensity distribution pattern, the candidate intensity distribution pattern comprising a plurality of intensity values;
(c) comparing the intensity values of the candidate intensity distribution pattern with respective intensity values of the target intensity distribution pattern to determine respective intensity difference values;
(d) if each of the intensity difference values is sufficiently small or zero, selecting the candidate hologram to be said selected hologram; and
(e) if each of the intensity difference values is not sufficiently small or zero, adjusting one or more of the phase values of the candidate phase distribution pattern and repeating steps (b), (c) and (d) until a determination is made at step (d) that each of the intensity difference values is sufficiently small or zero.

15. The method of claim 13, wherein designing the diffractive coupling element includes:
mapping the phase values of the phase distribution pattern of the selected hologram to one or both of variations in a surface thickness of the substrate material design and variations in an index of refraction of the substrate material design.

16. The method of claim 15, wherein the suitable substrate material glass.

17. The method of claim 15, wherein the suitable substrate material plastic.

18. The method of claim 15, wherein the suitable substrate material polymer.

19. The method of claim 15, wherein the suitable substrate material is a semiconductor material.

20. A method for designing and manufacturing a diffractive coupling element for controlling a launch of laser light from a laser source into an end of an optical fiber, the method comprising:
with one or more computers executing one or more computer programs:
selecting a target intensity distribution pattern for laser light to be launched from a laser source into an end of an optical fiber, wherein the selected intensity distribution pattern is selected based on a determination that the intensity distribution pattern should be effective at substantially avoid refractive index defects in a center region and in an edge region of the optical fiber of the communications link;
selecting a hologram that has a phase distribution pattern that is transformable into the selected intensity distribution pattern; and
designing a diffractive coupling element to be used in an optical coupling system of an optical transmitter, the diffractive coupling element design including a design of a substrate material having the phase distribution pattern of the selected hologram formed therein;
and
manufacturing a diffractive optical element corresponding to the designed diffractive optical element.

21. The method of claim 20, further comprising:
assembling an optical transmitter, wherein assembling the optical transmitter includes configuring an optical coupling system of the optical transmitter to include the manufactured diffractive coupling element.

* * * * *